United States Patent
Daines et al.

(10) Patent No.: US 6,192,422 B1
(45) Date of Patent: Feb. 20, 2001

(54) REPEATER WITH FLOW CONTROL DEVICE TRANSMITTING CONGESTION INDICATION DATA FROM OUTPUT PORT BUFFER TO ASSOCIATED NETWORK NODE UPON PORT INPUT BUFFER CROSSING THRESHOLD LEVEL

(75) Inventors: Bernard Nelson Daines; Frank S. Lawrence, both of Spokane, WA (US)

(73) Assignee: Alcatel Internetworking, Inc., Calabasas, CA (US)

(*) Notice: Under 35 U.S.C. 154(b), the term of this patent shall be extended for 0 days.

(21) Appl. No.: 09/036,727

(22) Filed: Mar. 6, 1998

Related U.S. Application Data (60) Provisional application No. 60/043,186, filed on Apr. 16, 1997.

(51) Int. Cl.[7] .................. G06F 3/02; G06F 13/14; G06F 13/38; G06F 15/16; H04B 7/14
(52) U.S. Cl. .................. 710/29; 710/36; 710/52; 710/53; 710/240; 709/232; 709/235
(58) Field of Search .................. 709/232, 235; 710/29, 36, 52, 53, 240

(56) References Cited

U.S. PATENT DOCUMENTS

| | | | |
|---|---|---|---|
| 5,090,011 | * | 2/1992 | Futuka et al. ............ 370/60 |
| 5,400,329 | * | 3/1995 | Tokura et al. ............ 370/84 |
| 5,467,351 | * | 11/1995 | Baumert ............ 370/85.15 |
| 5,473,604 | * | 12/1995 | Lorenz et al. ............ 370/60 |
| 5,666,488 | * | 9/1997 | Joh ............ 395/200.83 |
| 5,724,358 | * | 3/1998 | Headrick et al. ............ 370/418 |
| 5,740,174 | * | 4/1998 | Somer ............ 370/402 |
| 5,796,738 | * | 8/1998 | Scott et al. ............ 370/401 |
| 5,838,677 | * | 11/1998 | Kozaki et al. ............ 370/389 |
| 5,883,894 | * | 3/1999 | Patel et al. ............ 370/438 |
| 5,970,048 | * | 10/1999 | Pajuvirta et al. ............ 370/230 |
| 5,978,383 | * | 11/1999 | Molle ............ 370/445 |
| 6,002,675 | * | 12/1999 | Ben-Michael et al. ............ 370/315 |

OTHER PUBLICATIONS

IEEE Standard 802.3 Part 3 (1998 Edition), IEEE802.3 Clause by Document, "Carrier Sense Multiple Access With Collision Detection (CSMA/CD) Access Method and Physical Layer Specifications", pp. xii, 791–891, 1206–1215.
Quinn & Russell, "Fast Ethernet Repeaters," *Fast Ethernet*, pp. 31–55 (1997).
Breyer & Riley, "Switched Ethernet and Fast Ethernet Standards," *Switched and Fast Ethernet: How It Works and How to Use It*, pp. 41–78 (1995).

* cited by examiner

*Primary Examiner*—Thomas C. Lee
*Assistant Examiner*—Tanh Nguyen
(74) *Attorney, Agent, or Firm*—Christie, Parker & Hale, LLP (57) ABSTRACT

A full duplex repeater for collision-free transmission of data packets between node of a local area network. The repeater includes a multiple of ports, a signal path for communicating data between the ports, and an arbitration mechanism. Each of the ports has an input and output buffer. The mechanism routes data through the repeater by activating each of the ports one port at a time, such as with a round robin algorithm, to transmit stored data from the input buffer of an activated port through the signal path to the other ports. The repeater has a congestion control mechanism that includes level indicators and preset high and low threshold levels for the input buffers and a flow control device. The flow control device monitors the level indicators to determine if the amount of data in a buffer exceeds the high threshold level. If that occurs, the flow control device alerts the transmitting node to stop transmitting by inserting a congestion indication frame into the port's output buffer for transmission to the node. Once the amount of data in the input buffer then drops below the low threshold level, the flow control device alerts the transmitting node to resume transmitting by inserting a clear indication frame in the port's output buffer.

31 Claims, 6 Drawing Sheets

REPEATER WITH FLOW CONTROL DEVICE TRANSMITTING CONGESTION INDICATION DATA FROM OUTPUT PORT BUFFER TO ASSOCIATED NETWORK NODE UPON PORT INPUT BUFFER CROSSING THRESHOLD LEVEL

RELATED APPLICATION DATA

This application is based on U.S. Provisional Application Ser. No. 60/043,186, filed Apr. 16, 1997.

FIELD OF THE INVENTION

This invention relates generally to computer networking devices. More particularly, this invention relates to method and apparatus for increasing the data throughput of local area computer networks (LANs), particularly networks defined by IEEE standard 802.3 and commonly known as Ethernet networks.

BACKGROUND OF THE INVENTION

A local area network (LAN) is a system for directly connecting multiple computers so that they can directly exchange information with each other. LANs are considered local because they are designed to connect computers over a small area, such as an office, a building, or a small campus. LANs are considered systems because they are made up of several components, such as cable, repeaters, network interfaces, nodes (computers), and communication protocols.

Every LAN type has a set of rules, called topology rules, that dictate how the components of the network are physically connected together. Ethernet is one such set of topology rules. Background information on the Ethernet specifications and computer networks can be found in a number of references such as the IEEE 802.3 standards, Fast Ethernet (1997) by L. Quinn et al., and *Computer Networks* (3rd Ed. 1996) by A. Tannenbaum, which are incorporated herein by reference. Ethernet operates as a bussed network in which each of the nodes connects to a common bus. On early Ethernet networks, all the nodes were literally attached to a single segment of cable (the bus) with T connectors. The network could be extended by connecting pieces of cable together with two-port repeaters. These repeaters "repeat" signals transmitted through the cable by restoring the signal's shape and strength to its original characteristics.

Figure 1:
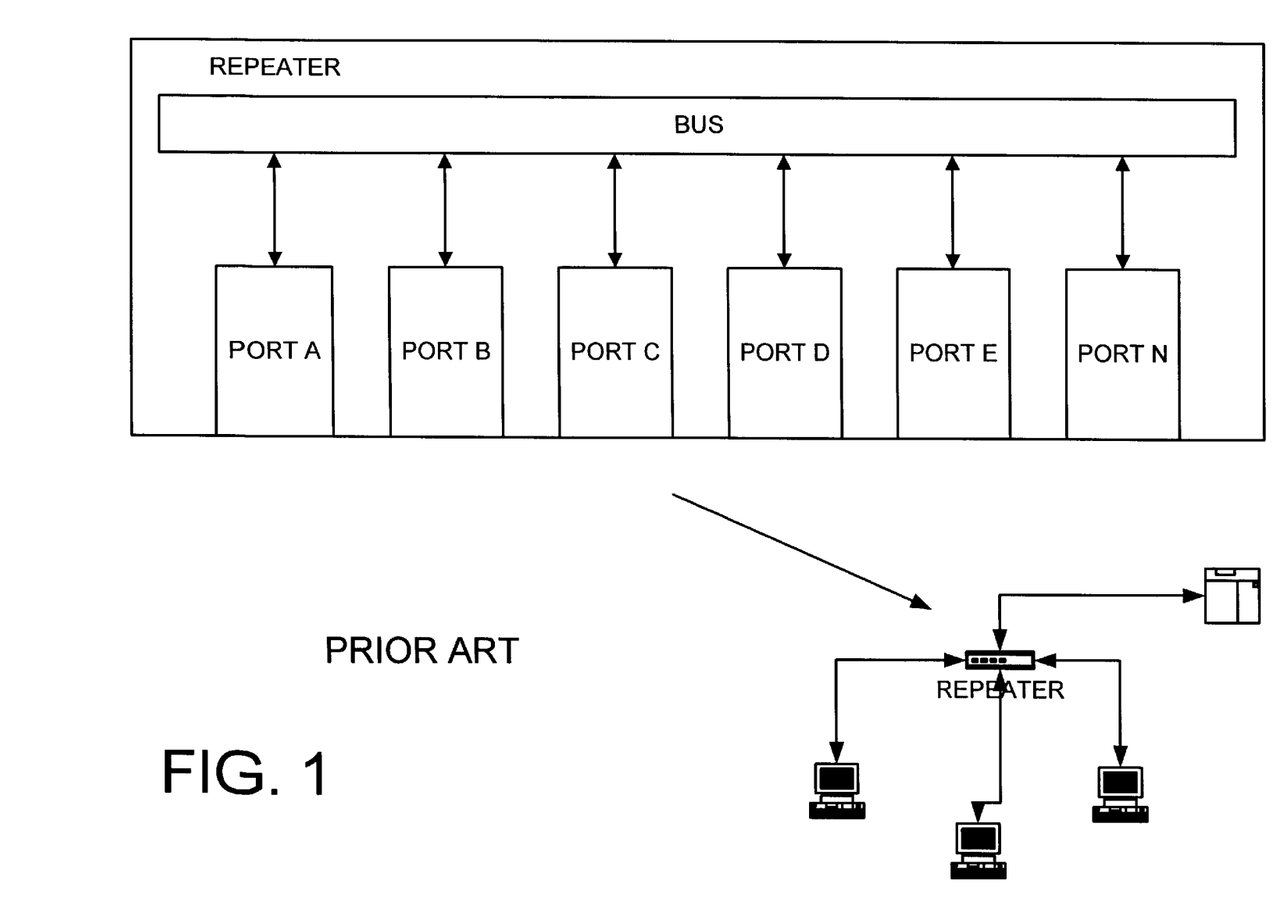
FIG. 1 is a block diagram of a conventional repeater for a local area network.

Newer Ethernet technologies improved on these early repeaters by introducing the concept of a repeater hub (often called just a hub or a repeater). A repeater hub, shown in a block diagram in FIG. 1, is a device that each node on the network plugs into instead of having a T connection to a common cable. A repeater hub replaces the cable and T connection of the bussed network but behaves just like the shared cable. Each node, which may be a personal computer, server, printer, etc., connects to a port of the central hub via a cable, with only one node per cable. This arrangement creates a "Hub and Spoke" or "Star" topology as shown in FIG. 1 that operates as a bussed network. Inside the hub is a digital bus that connects to multiple ports. The ports of a typical repeater hub operate exactly as the ports of early repeaters, except that a hub has many more ports than the two found in the early repeaters.

Conventional repeater hubs, however, do not address the problem that the maximum size of a LAN shrinks as the data rate of the LAN increases. This increase has occurred as Ethernet, which operates at 10 megabits per second (Mbps) has been extended to Fast Ethernet (100 Mbps) and presently to Gigabit Ethernet (1000 Mbps). With conventional network components including repeater hubs, the increased rate requires a reduction in the diameter of the local area network (the maximum cable distance between two nodes). In the move from standard Ethernet at a network speed of 10 Mbps to Fast Ethernet at a network speed of 100 Mbps, the allowable network diameter shrank from 2.5 kilometers to 250 meters, a factor of 10. The same effect will occur when network speed is increased from 100 Mbps to 1000 Mbps. The theoretical allowable maximum diameter will be reduced to 25 meters.

The reason for this reduction in network diameter relates to the media access rules adopted by the IEEE 802.3 committee for Ethernet networks (known as the CSMA/CD rules for Carrier Sense Multiple Access with Collision Detection) and to the physical nature of the components making up a network. Briefly, under the CSMA/CD rules, each of the multiple nodes on a network (forming a "collision domain") first listens for a carrier on the shared network media (e.g., cable) before transmitting a data packet to other nodes (the carrier sensing). Once the network media is free, nodes with a pending packet may transmit the packet. If two or more nodes simultaneously transmit packets on the network media, however, the packets collide. Ideally the sending nodes detect the collision and resend the corrupted packets after random delay times. These access rules are implemented in each node by a media access controller (MAC) device.

Collisions occur because signal propagation delay within the network components prevents a second node from immediately sensing when a first node has begun a transmission. For example, assume that the network media is clear and that the first and second nodes have packets to transmit. The first node then begins its transmission. The second node will not be aware of the first node's transmission until it actually reaches the second node because of the propagation delay. During that delay the second node may begin its own transmission, and the two packets will collide. This situation is called contention, as the nodes contend for control of the media rather than defer to one another.

The time difference, in terms of propagation delay, between two particular nodes on an Ethernet network is called the Path Delay Value (PDV). The PDV for two particular nodes is calculated by adding up the individual propagation delays of each component between the MACs at each node and multiplying the total by two. This is the time it takes for a bit to travel round trip from one node to another and then back. The maximum PDV for a network is called the "collision window" and is directly dependent on the network diameter. The larger the network diameter is, the larger the network's collision window.

The Ethernet specification defines the maximum allowable collision window to be 512 bit times This value is called the "slot time." Two values are derived from the slot time: the minimum frame size of 512 bits (64 bytes) and the maximum allowable network diameter. The network diameter must be small enough that a signal can start from a MAC on one node and travel to a MAC on any other node and back inside the slot time.

Stated another way, the network's collision window must be less than or equal to the slot time.

A maximum collision window is specified because, under the CMSA/CD rules, a node only detect collisions while it is sending a frame.

Once the node completely sends the frame, it assumes the transmission was successful. If the network's collision window exceeds the slot time, a node can completely send a frame before the node detects that the frame has collided with other data on the media. At that point, however, it is too late. The node will not automatically retransmit the frame. The network protocol must then recover the lost frame in a lengthy process that temporarily but significantly degrades network performance.

With this as background, it now can be understood why, with conventional network components, faster network speeds require a reduction in network diameter. As described above, a node is assured of detecting a collision only during the time it is transmitting a minimum-sized frame. This is the slot time, which is specified to be 512 bit times. The maximum allowable collision window is thus also 512 bit times. As the network speed increases from 10 to 100 to 1000 Mbps, the slot time required to transmit 512 bits decreases by a factor of 100 to 512 nanoseconds. Because of the signal propagation delay, the maximum allowable network diameter must be reduced accordingly, or the nature of the network makeup itself must be changed, to ensure that collisions are detected within the reduced slot time.

A common solution to this problem of network size reduction is to break up a network consisting of a single collision domain into multiple smaller collision domains and connect the multiple domains together with frame switches. See, for example, chapter 12 of *Fast Ethernet* (1997) by L. Quinn et al. Each of the smaller collision domains has the maximum allowable network diameter. The entire network then has an allowable diameter that is the sum of the diameters of the multiple domains. To communicate with a node in another domain, however, a node in one domain must now transmit packets through one or more frame switches. This solution thus increases the cost, complexity and delay of the network.

Another solution is to employ the carrier extension option provided for in 802.3z to increase the slot time and thereby the maximum network diameter. But this option reduces the maximum data rate, depending on the packet size.

An objective of the invention, therefore, is to provide a simple and low-cost method and means for transmitting data through a computer network at a higher rate without reducing the diameter of the network.

More specifically, an objective of the invention is to remove the network diameter limit by changing the nature of the network components so that packet collisions cannot occur. Another objective of the invention is to improve its efficiency, that is, the percentage of time that the network is actually passing data packets.

SUMMARY OF THE INVENTION

In accordance with the invention, a network device for communicating data between multiple nodes of a computer network comprises a multiple of ports for data communication with associated network nodes and input buffers associated with the multiple ports for storing data received by a port from an associated network node. The network device also includes a signal path for communicating data between the ports and an arbitration mechanism for routing data between ports by activating only one port at a time to transmit data stored in the input buffer of an activated port through the signal path to the other ports.

The network device can be a repeater, the signal path can be a bus, and the arbitration mechanism can use a round robin algorithm to activate the ports, preferably to transmit one data frame per activation.

In one aspect of the invention, the arbitration mechanism activates a port by checking the port buffer to determine if the port has data to transmit to the other ports. If so, the mechanism activates the port to transmit the data and, if not, the mechanism does not activate the port.

In another aspect of the invention, the network device includes a flow control mechanism comprising level indicators for the input buffers for indicating the amount of data stored in a buffer and a flow control device for monitoring the level indicators to determine if the amount of data in an input buffer crosses a first threshold level. If so, the flow control mechanism inserts congestion indication data into an output buffer for the port to alert the associated node to cease transmitting data packets to the port. When the level indicator crosses a second threshold level, the flow control mechanism inserts congestion clear indication data into an output buffer for the port to alert the associated node to resume transmitting data packets to the port.

DETAILED DESCRIPTION OF AN ILLUSTRATED EMBODIMENT

The Repeater Structure

Figure 2:
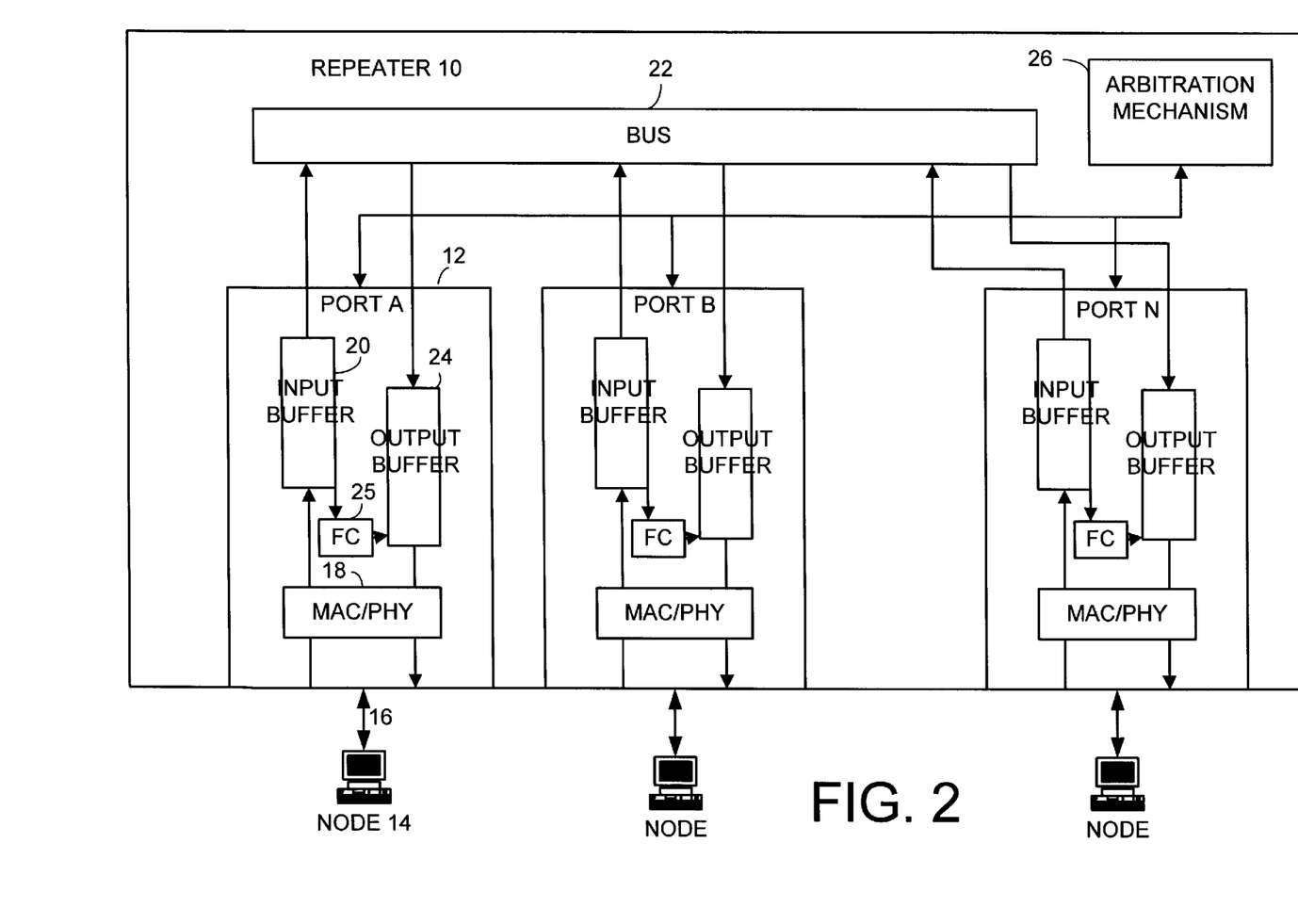
FIG. 2 is a block diagram of a repeater according to the invention.

FIG. 2 is an architectural block diagram of a network device such as a repeater 10 built in accordance with the invention. (The terms "repeater," "hub," and "repeater hub" are used interchangeably here and in the art.) The repeater 10 includes multiple ports 12 such as ports A through N for data communications with associated network nodes 14 such as personal computers. The nodes are connected to the repeater ports through cable 16 or other media and network interfaces such as network interface cards (NICs) within the nodes. Any reasonable number of ports may be included within repeater 10, with port N intended to illustrate this point.

Ports A through N are of a full duplex design that permits a port to transmit and receive data simultaneously. Each port is built in accordance with the desired IEEE 802.3 standard for Ethernet networks, such as the 802.3z Gigabit Ethernet standard. Structurally, each port includes a physical layer device (PHY) and media access controller (MAC) that operate in a full duplex. These devices are represented in FIG. 2 by the MAC/PHY block 18 within each port. The PHY transceiver device is of conventional design and converts between the electrical or optical signals on the cable and a standard digital signal used internally by the repeater 10. For data being received by the repeater 10 from a network node, the MAC converts the stream of digital signals (bits) provided by the PHY into an Ethernet frame. The MAC then processes the digital signal at the frame level to ensure that the frame contains no errors and is thus valid and can be forwarded to other network nodes. If the MAC determines the frame is invalid, it marks the frame as invalid before forwarding it (which eventually will result in the sending node sending another copy of the packet containing the frame). For data being transmitted by the repeater to a network node, the MAC converts the Ethernet frame back into a bit stream and passes the stream to the PHY for transmission over the cable to the associated network node.

Each port A through N further includes an associated input buffer 20 for storing data received from a network node. The MAC temporarily stores Ethernet frames produced from the PHY bit stream in the input buffer for placement onto a internal signal path such as a bus 22 The input buffer is preferably of first-in-first-out (FIFO) design so that data frames are put onto the bus in the order in which they are stored in the input buffer. The bus 22 is internal to the repeater 10 and coupled to each of the ports to communicate data frames between them.

Each port A through N also includes an associated output buffer 24 for storing data frames received by the port from another port via the bus 22. The MAC reads these data frames from the output buffer (also preferably of FIFO design), converts them into a bit stream, and provides the bits stream to the PHY for further conversion and transmission to the associated network node. The output buffer can be smaller in size than the input buffer because fewer frames need be stored for output than for input, as described below.

Also within each of these ports is a flow control device (FC) 25 in communication with the input and output buffers for controlling the flow of data packets through the repeater 10. The flow control device 25 limits congestion within the repeater, as described below.

The ports A through N transmit data packets (which contain the data frames) to each other via the bus 22 in response to commands from an arbitration mechanism 26 that controls data flow through the repeater. Specifically, the mechanism 26 routes data stored in the input buffer of a port to other ports by activating, or enabling, only one port at a time to transmit the stored data from the activated port via the bus to the other ports. This data transmission is collision-free because only one port at a time (the activated port) uses the bus. The other ports cannot transmit data onto the bus while the one port is active.

The Routing Method

Figure 3:
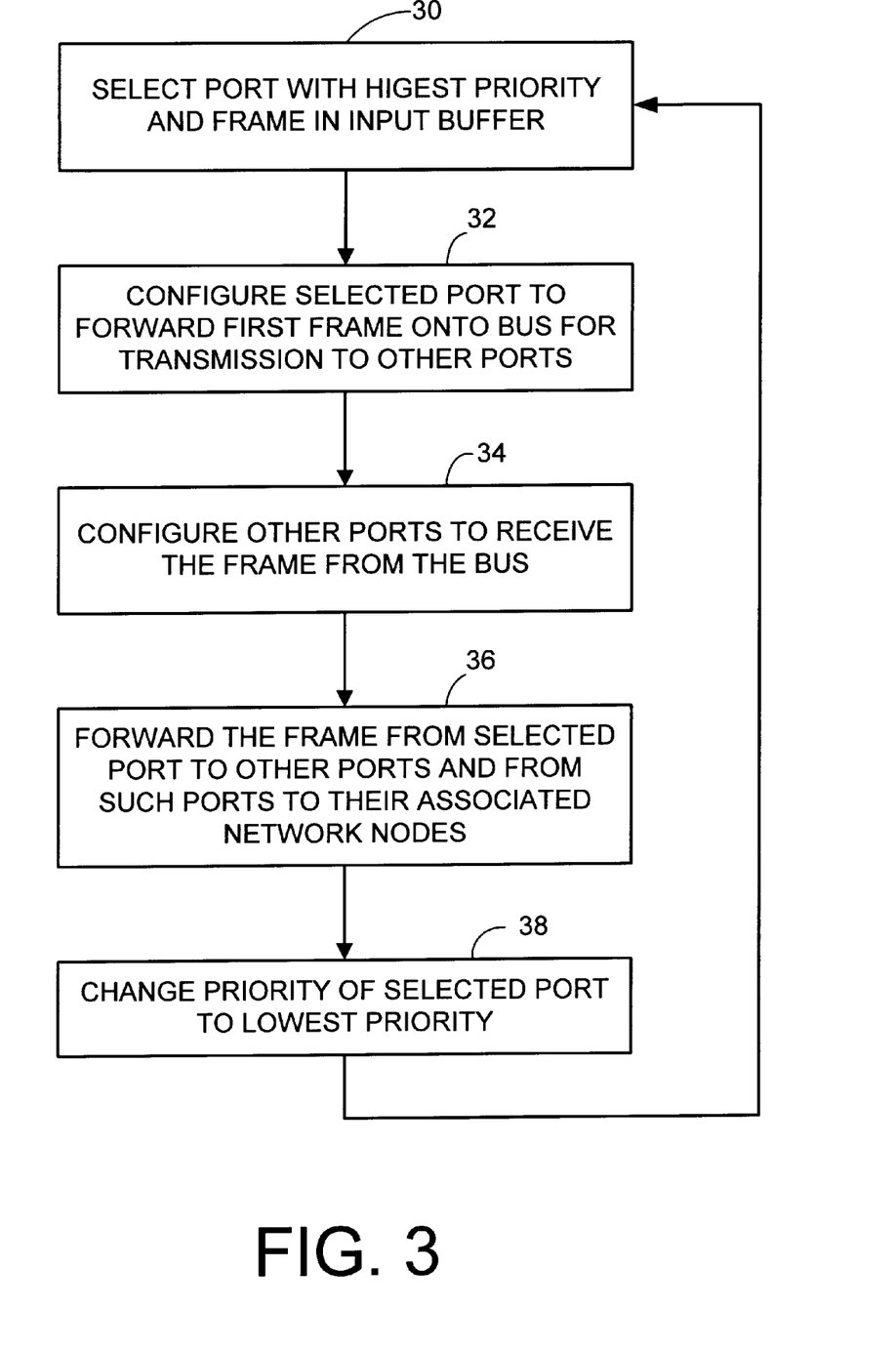
FIG. 3 is flowchart of a method according to the invention for activating ports to propagate data through a network device such as the repeater of FIG. 2.
Figure 4:
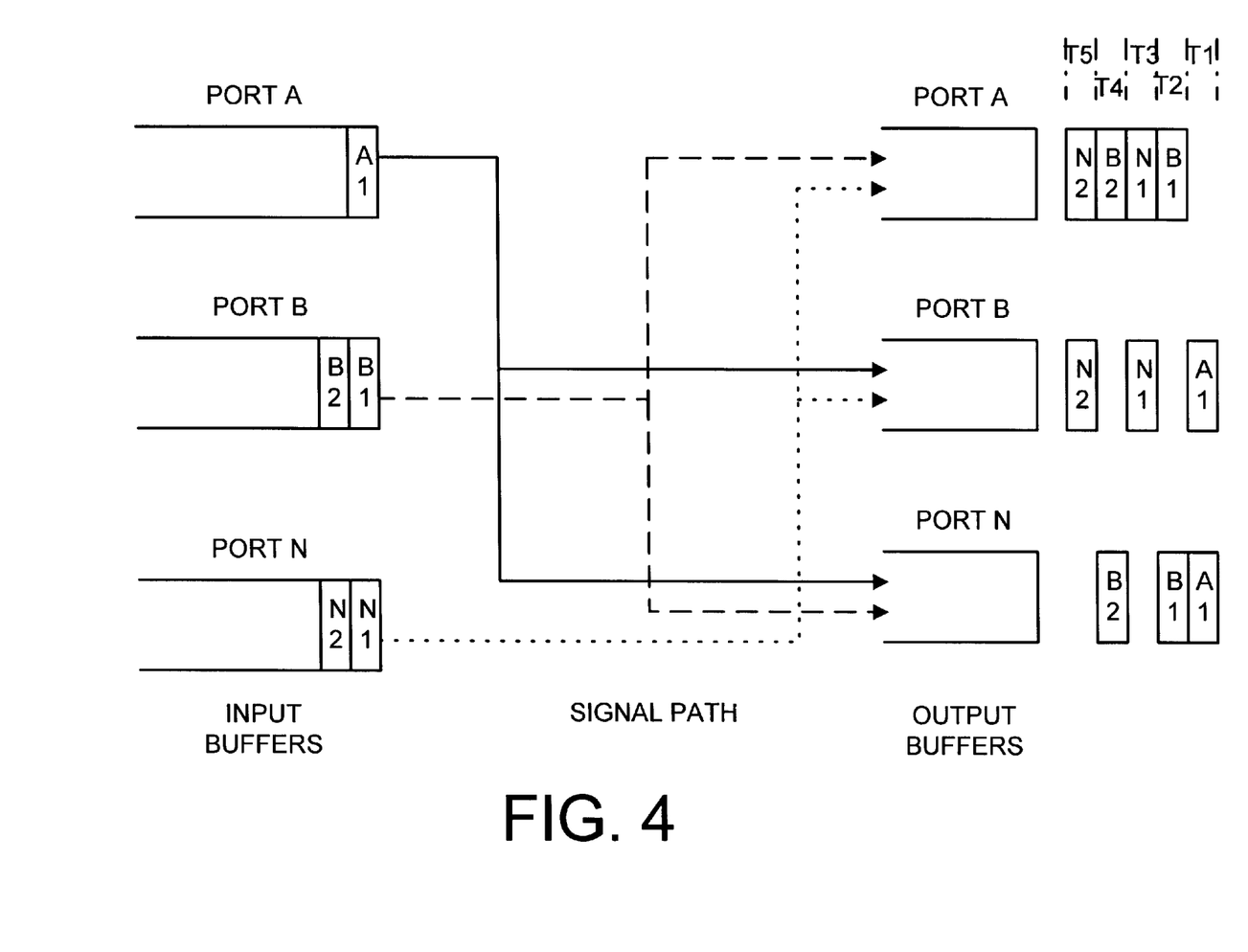
FIG. 4 is a data flow diagram showing how data propagates through a repeater in accordance with the invention.

FIGS. 3 and 4 illustrate a routing method applied by the arbitration mechanism in accordance with the invention. FIG. 3 is flowchart of the logical steps of a method for collision-free transmission of data packets through the repeater. It should be understood that while separate steps are shown for clarity, the steps may be executed sequentially or in parallel in any number of different implementations. In a parallel implementation of the method, all of the ports are checked simultaneously in accordance with a priority encoding that changes as ports are activated.

The illustrated routing method is based on a round robin algorithm. Other routing methods, of course, can be used by the arbitration mechanism. For example, the order and number of ports enabled can be changed. FIG. 4 is a data flow diagram showing an example of how packets are routed through the repeater with the illustrated method.

Referring to FIG. 3, the arbitration mechanism 26 begins each pass through its routing algorithm by selecting the port with the highest priority and a frame in its input buffer (step 30). Priority can be assigned in any number of ways, such as by lowest-numbered or lettered port (1 or A) In selecting a port, the arbitration mechanism checks if the input buffer 16 of a port contains a data frame. If not, the port is not selected and activated. The mechanism activates the selected port by configuring it to forward the first frame in the buffer onto the bus 20 (step 32). Preferably a limited number of frames such as only one frame is forwarded per port activation so that each port has an opportunity to timely transmit its frames. The mechanism also configures the other ports to receive the data frame of the first port from the bus (step 34). Once all ports are ready for the frame transmission, the mechanism 26 forwards the frame from the first port to the other ports (step 36), where it is transmitted via the output buffer 24 and MAC/PHY 18 or each port to the associated network nodes 14. The mechanism then changes the priority of the selected port to the lowest priority (step 38) so that all other ports have higher priorities. In this way the ports are activated in a sequence. This continues indefinitely, so long as the computer network using the repeater is operating properly.

FIG. 4 is an example of how data is routed in accordance with the invention. Incoming data entering the repeater from network nodes is converted by the MAC/PHY to frames and queued in the respective ports' input buffers, such as frame A1, B1, B2, etc. Assume port A is initially checked for a data frame. The arbitration mechanism 26 checks port A's input buffer and finds frame A1 present (step 32 in FIG. 3). It then configures port A to transmit frame A1 onto the bus and configures the other ports, ports B through N, to listen to the bus. This configuration is illustrated by the solid line signal path connecting port A's input buffer to the output buffers of ports B through N. While this configuration is present, port B and port N cannot transmit data onto the bus and therefore collisions between data frames cannot occur. In a first transfer T1, then, the arbitration mechanism forwards frame A1 from port A to the output buffers of ports B through N, where the frame is transmitted by these ports to their respective network nodes. In a second transfer T2 the output buffer of port B is checked and determined to contain a data frame B1. The ports are then configured to forward this frame from port B to the output buffers of ports A and N (as illustrated by the dashed line signal path) and on to the associated nodes. In a third transfer T3 the output buffer of port N is checked and determined to contain a data frame N1. The ports are then configured to transmit this frame from port N to the output buffers of ports A and B (as illustrated by the dotted line signal path) and on to the associated nodes.

The algorithm then repeats, returning again to port A. But this time no frame is found in the port's input buffer, so the port is not activated to transmit a frame. The arbitration mechanism moves quickly to port B and in a fourth transfer T4 configures the ports to forward frame B2 to the output buffers of ports A and N and from there to these ports' respective nodes. In a fifth transfer T5 the arbitration mechanism configures the ports to forward frame N2 to the output buffers of ports A and B and on to the respective nodes.

Congestion Control

Each of ports A through N is constructed to pass data through its input and output at up to a specified rate such as 1000 Mbps. This rate enables the repeater 10 to route data between the nodes 14 at an extremely high rate. If several nodes 14, however, are transmitting data to their ports at high rates, the total data rate on the bus 22 may exceed a port's specified maximum output rate. Data backs up in what is known as congestion. To ensure that data is not lost (by dropping of frames), the repeater includes a flow control mechanism operating in accordance with the IEEE 803.2x standard to control the congestion by controlling the rate at which data flows through the repeater. This mechanism includes a level indicator and high and low threshold levels for each input buffer and the flow control device 25 that monitors the level indicators.

Figure 6:
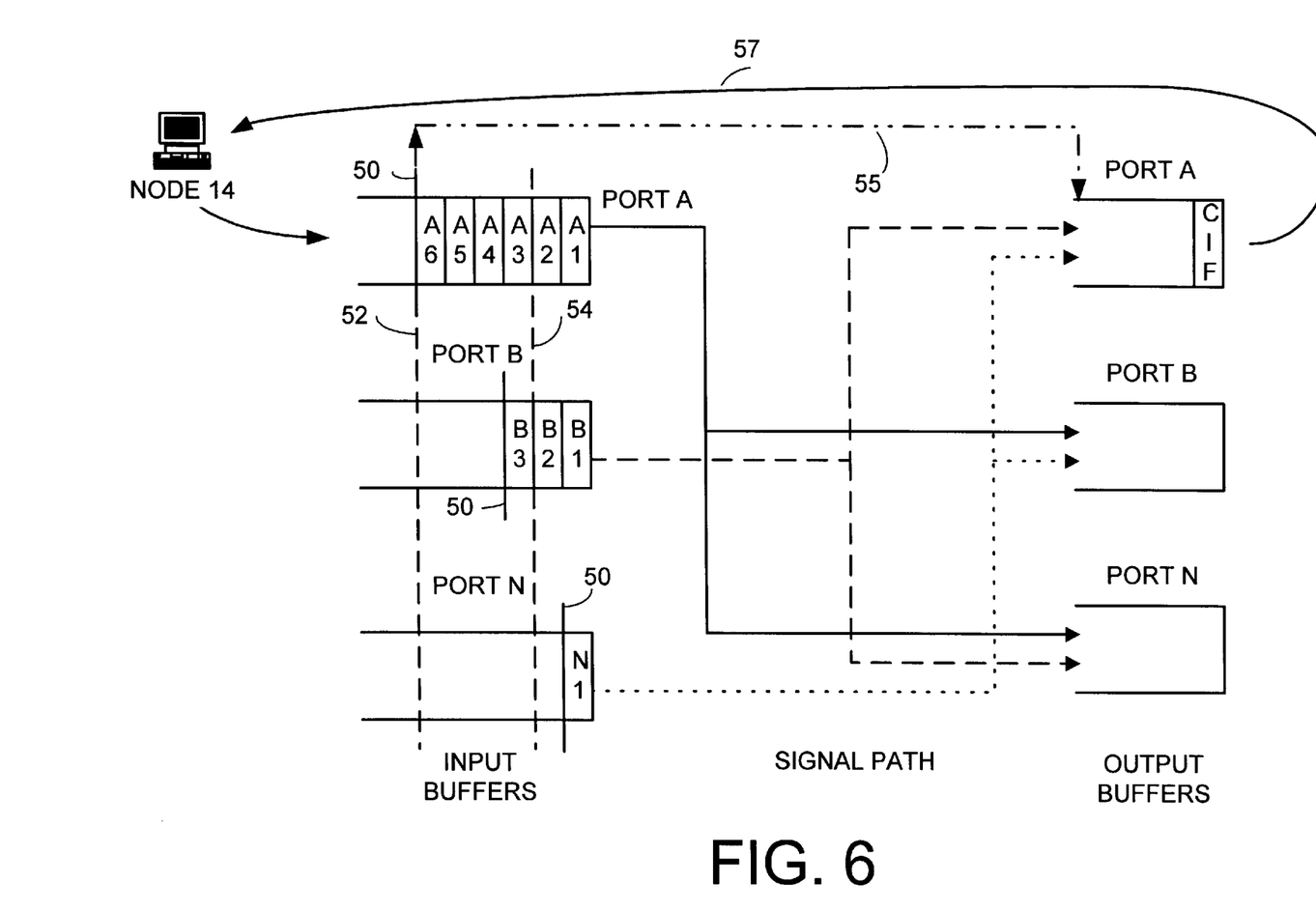
FIG. 6 is a data flow diagram showing how congestion is controlled in a repeater in accordance with the invention.

Referring to FIG. 6, each input buffer 20 is equipped with a level indicator 50 and preset high and low threshold levels 52, 54 (also known as "watermarks"). The level indicator indicates the amount of data stored in the buffer to flow control device 25, and the threshold levels 52, 54 define the maximum data level and a "restart" level.

Figure 5:
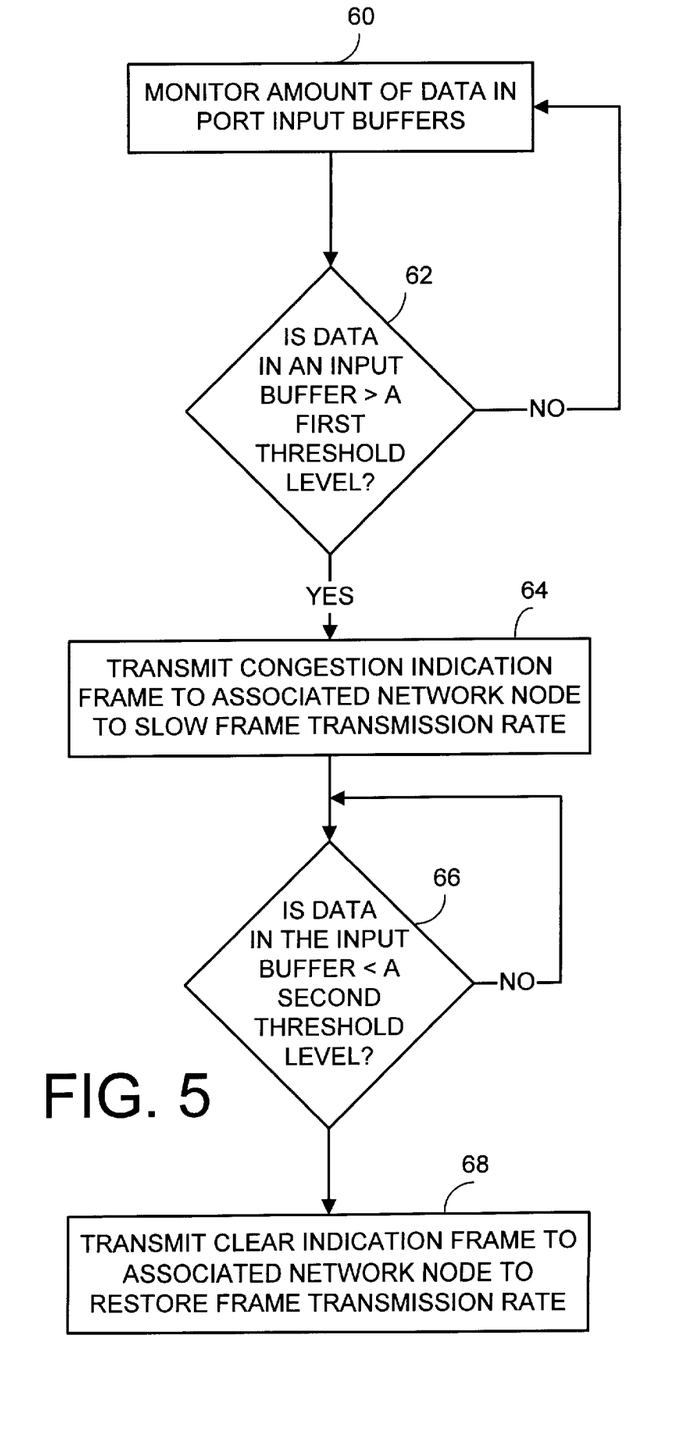
FIG. 5 is a flowchart of a method according to the invention for controlling congestion in a network device such as the repeater of FIG. 2.

The congestion control works as shown in the flowchart of FIG. 5. The flow control device continually monitors the level indicator for each input buffer (step 60) to determine if the amount of data stored therein exceeds a first threshold level (step 62). If the level indicator for a particular input buffer crosses the first threshold level 52, then the associated port transmits a congestion indication frame (CIF) to the sending network node 14 to alert the node to stop transmitting (step 64). The flow control device 25 accomplishes this task by inserting the congestion indication frame into the output buffer 24 of the port associated with the network node. The network node responds to this frame by stopping its transmission of packets.

The network node ceases transmission until alerted by the flow control device 25 that the congestion has cleared. To make that determination, the flow control device continually checks if the amount of data in the input buffer has dropped below the second threshold level 54 (step 66). Once the level indicator crosses the second threshold level, the flow control device transmits a clear indication frame (CRIF) to the output buffer associated with the network node (step 68). The network node responds to this frame by restarting its data transmission.

FIG. 6 is an example of how this method of congestion control operates. The level indicator 50 for port A is shown as crossing threshold level 52, generating a message to flow control device 25 that port A's input buffer is full. The flow control device responds by generating a congestion indication frame and inserting it into port A's output buffer (this action indicated by arrow 55). The output buffer transmits the CIF back to the associated node (indicated by arrow 56) to alert it to stop transmitting. Consequently, the number of frames in port A's input buffer gradually decreases as frames stored in the buffer are transmitted onto the bus 22. The level indicator 50 will move toward the right as this occurs, eventually crossing the threshold level 54. At this point, flow control device 25 will generate a clear indication frame and insert it into port A's output buffer for transmission to the network node 14. Once received, the network node will respond by resuming its transmission of data packets to the associated port.

The input buffers 20 for ports B and N illustrate different states for a level indicator. In the case of port N, a clear indication frame is not necessarily sent just because the level indicator has dropped below the lower threshold level 54. The level indicator must have first crossed the higher threshold level, causing the associated node to reduce its data transmission rate. Simply dropping below the lower threshold level is not enough to generate a congestion clear indication frame.

Having illustrated and described the principles of the invention in the above embodiment, it will be apparent to those skilled in the art that the embodiment can be modified in arrangement and detail without departing from those principles. For example, the arbitration mechanism can monitor the ports' input buffers using any of a number of well-known techniques such as priority encoding, polling or interrupts. The ports can be activated in any order. The invention can also be applied to network devices other than repeaters. The above embodiment should be viewed therefore as only one of a number of possible examples of the invention and not as a limitation on its scope. We therefore claim as our invention all that comes within the scope and spirit of these claims.

We claim:

1. A network device for communicating data between multiple nodes of a computer network comprising:
   a multiple of ports for data communication with associated network nodes;
   one or more input buffers associated with each of the multiple ports for storing data received by a port from a network node;
   a signal path for communicating data between the ports;
   a mechanism for routing data between ports by activating only one port at a time to transmit data stored in the input buffer of an activated port through the signal path to the other ports;
   level indicators for the input buffers for indicating the amount of data stored in a buffer;
   output buffers associated with the multiple ports for storing data received by a port from another port; and
   a flow control device for monitoring the level indicators to determine if the amount of data in a port input buffer crosses a first threshold level and, if so, inserting congestion indication data into the port output buffer for transmission to the associated network node;
   wherein the network device is a repeater.

2. The network device of claim 1 wherein the signal path is a bus.

3. The network device of claim 1 wherein the mechanism includes an arbitration mechanism that uses a round robin algorithm to activate the ports.

4. The network device of claim 1 wherein the mechanism activates a port to transmit only one data. frame per activation.

5. The network device of claim 1 wherein the t mechanism activates a port by:
   checking the port buffer to determine if the port has data to transmit to the other ports;
   if so, activating the port to transmit the data; and
   if not, not activating the port.

6. The network device of claim 1 wherein the mechanism activates each of the multiple ports one port at a time.

7. The network device of claim 1 including a media access controller for detecting if a data frame received by a port from a network node is valid.

8. The network device of claim 1 including a flow control device for monitoring the input buffers and for notifying a network node associated with an input buffer if the amount of data stored in the input buffer crosses a given threshold level.

9. The network device of claim 1 wherein the device is an Ethernet device for transmitting data in accordance with the IEEE 802.3 standard.

10. The network device of claim 1 wherein the input buffers are FIFO memory for storing and forwarding data on a first-in-first-out basis.

11. The network device of claim 1 wherein the ports are constructed for data communication with associated network nodes in a full duplex mode.

12. A network device for communicating data between multiple nodes of a computer network comprising:
   a multiple of ports for data communication with associated network nodes;
   one or more input buffers associated with each of the multiple ports for storing data received by a port from a network node;
   a signal path for communicating data between the ports;
   a mechanism for routing data between ports by activating only one port at a time to transmit data stored in the input buffer of an activated port through the signal path to the other ports;

level indicators for the input buffers for indicating the amount of data stored in a buffer;

output buffers associated with the multiple ports for storing data received by a port from another port; and a flow control device for monitoring the level indicators to determine if the amount of data in a port input buffer crosses a first threshold level and, if so, inserting congestion indication data into the port output buffer for transmission to the associated network node;

wherein the flow control device is further constructed for monitoring the level indicators to determine if the amount of data in a port input buffer subsequently crosses a second threshold level and, if so, inserting non-congestion indication data into the port output buffer.

13. The network device of claim 12 wherein the first and second threshold levels are different levels.

14. The network device of claim 12 wherein the device is a repeater.

15. The network device of claim 12 wherein the signal path is a bus.

16. The network device of claim 12 wherein the mechanism includes an arbitration mechanism that uses a round robin algorithm to activate the ports.

17. The network device of claim 12 wherein the mechanism activates a port to transmit only one data frame per activation.

18. The network device of claim 12 wherein the mechanism activates a port by;

checking the port buffer to determine if the port has data to transmit to the other ports;

if so, activating the port to transmit the data; and if not, not activating the port.

19. The network device of claim 12 wherein the mechanism activates each of the multiple ports one port at a time.

20. The network device of claim 12 including a media access controller for detecting if a data frame received by a port from a network node is valid.

21. The network device of claim 12 including a flow control device for monitoring the input buffers and for notifying a network node associated with an input buffer if the amount of data stored in the input buffer crosses a given threshold level.

22. The network device of claim 12 wherein the device is an Ethernet device for transmitting data in accordance with the IEEE 802.3 standard.

23. The network device of claim 12 wherein the input buffers are FIFO memory for storing and forwarding data on a first-in-first-out basis.

24. The network device of claim 12 wherein the ports are constructed for data communication with associated network nodes in a full duplex mode.

25. A repeater for communicating data between multiple nodes of a computer network comprising:

a multiple of ports for full duplex data communication with associated network nodes;

input buffers associated with each of the multiple ports for storing data received by a port from a network node;

a bus for communicating data between the ports;

an arbitration mechanism for routing data between ports by activating only one port at a time to transmit data stored in the input buffer of an activated port through the bus to the other ports;

level indicators for the input buffers for indicating the amount of data stored in a buffer;

output buffers associated with the multiple ports for storing data received by a port from another port; and a flow control device for monitoring the level indicators to determine if the amount of data in a port input buffer crosses a first threshold level and, if so, inserting congestion indication data into the port output buffer for transmission to the associated network node.

26. The repeater of claim 25 wherein the data is included within a data frame and the scheme activates a port to transmit only one data frame per activation.

27. A network device for communicating data between multiple nodes of a computer network comprising:

a multiple of ports for data communication with associated network nodes;

input buffers associated with the multiple ports for storing data received by a port from a network node;

level indicators for the input buffers for indicating the amount of data stored in a buffer;

a signal path for communicating data between the ports;

output buffers associated with the multiple ports for storing data received by a port from another port; and a flow control device for monitoring the level indicators to determine if the amount of data in a port input buffer crosses a first threshold level and, if so, inserting congestion indication data into the port output buffer for transmission to the associated network node; wherein the flow control device subsequently cancels the congestion indication if the amount of data in a port input buffer crosses a second threshold level.

28. The network device of claim 27 wherein the network device is a repeater.

29. The network device of claim 27, wherein the first threshold level is the same as the second threshold level.

30. A method of communicating data between multiple nodes of a computer network, the method comprising the following steps:

providing a multiple of ports for data communication with associated network nodes;

providing input buffers associated with the multiple ports for storing data received by a port from a network node;

providing output buffers associated with the multiple ports for storing data received by a port from another port;

communicating data stored in the input buffer of a port to other ports by activating only one port at a time to transmit stored data from the Activated port to the other ports;

monitoring a level indicator to determine the amount of data stored in an input buffer of a port;

if the amount of data in the input buffer exceeds a given amount, transmitting a congestion indication frame from the output buffer to the node associated with the input buffer's port; and if the amount of data in the input buffer subsequently falls below another given amount, transmitting a congestion clear indication frame from the output buffer to the node associated with the input buffer's port.

31. The method of claim 30 wherein activating a port comprises:

checking the port buffer to determine if the port has data to transmit to the other ports;

if so, activating the port to transmit the data; and if not, not activating the port.

* * * * *

UNITED STATES PATENT AND TRADEMARK OFFICE
CERTIFICATE OF CORRECTION

PATENT NO. : 6,192,422 B1
DATED : February 20, 2001
INVENTOR(S) : Bernard Nelson Daines and Frank S. Lawrence It is certified that error appears in the above-identified patent and that said Letters Patent is hereby corrected as shown below:

<u>Title page,</u>
Item [54], the title should read:
-- NETWORK DEVICE WITH FLOW CONTROL DEVICE TRANSMITTING CONGESTION INDICATION DATA FROM OUTPUT PORT BUFFER TO ASSOCIATED NETWORK NODE UPON PORT INPUT BUFFER CROSSING THRESHOLD LEVEL --
Item [73], the Assignee should read:
-- Alcatel Internetworking (PE), Inc.,
  Calabasas, CA (US) --

<u>Column 8,</u>
Line 30, replace "data. frame" with -- data frame --.
Line 32, replace "the t mechanism" with -- the mechanism --.

<u>Column 9,</u>
Line 42, replace "the. input" with -- the input --.

<u>Column 10,</u>
Line 47, replace "the Activated port" with -- the activated port --.

Signed and Sealed this

Seventeenth Day of December, 2002

JAMES E. ROGAN
*Director of the United States Patent and Trademark Office*